(12) United States Patent
Kim et al.

(10) Patent No.: US 10,910,837 B2
(45) Date of Patent: Feb. 2, 2021

(54) HYBRID CONTROL DEVICE FOR STATIC SYNCHRONOUS COMPENSATOR (STATCOM)

(71) Applicant: HYOSUNG HEAVY INDUSTRIES CORPORATION, Seoul (KR)

(72) Inventors: Ji Hun Kim, Seoul (KR); Jung Soo Park, Uiwang-si (KR); Hong Ju Jung, Seoul (KR); Hyun Ho Yoo, Seoul (KR); Joo Yeon Lee, Seoul (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 0 days.

(21) Appl. No.: 16/614,973

(22) PCT Filed: May 28, 2018

(86) PCT No.: PCT/KR2018/006026
§ 371 (c)(1),
(2) Date: Nov. 19, 2019

(87) PCT Pub. No.: WO2019/004606
PCT Pub. Date: Jan. 3, 2019

(65) Prior Publication Data
US 2020/0203953 A1 Jun. 25, 2020

(30) Foreign Application Priority Data
Jun. 28, 2017 (KR) .................. 10-2017-0081768

(51) Int. Cl.
*H02J 3/18* (2006.01)
*H02J 3/16* (2006.01)

(52) U.S. Cl.
CPC .............. *H02J 3/1864* (2013.01); *H02J 3/16* (2013.01); *H02J 3/1842* (2013.01); *H02J 3/1892* (2013.01)

(58) Field of Classification Search
CPC .......... H02J 3/1864; H02J 3/16; H02J 3/1842; H02J 3/1892; Y02E 40/10; Y02E 40/20; Y02E 40/30; Y04S 10/22
See application file for complete search history.

(56) References Cited

U.S. PATENT DOCUMENTS

| | | | | |
|---|---|---|---|---|
| 2009/0206606 | A1* | 8/2009 | Jorgensen | H02P 9/102 290/44 |
| 2010/0014327 | A1* | 1/2010 | Sakakibara | H02M 7/219 363/49 |

(Continued)

FOREIGN PATENT DOCUMENTS

| JP | 2002-281669 A | 9/2002 |
|---|---|---|
| JP | 5134691 B2 | 1/2013 |

(Continued)

OTHER PUBLICATIONS

Machine translation to English for KR 100497768 B2.*

*Primary Examiner* — Emily P Pham
(74) *Attorney, Agent, or Firm* — Novick, Kim & Lee, PLLC; Jae Yoon Kim

(57) ABSTRACT

Provided is a hybrid control device for a static synchronous compensator (STATCOM), the device including: a first arithmetic operation unit calculating the deviation between a reference voltage desired to be controlled by the STATCOM and output voltage to be output so as to output the same; a proportional integral (PI) controller performing PI control on the deviation output from the first arithmetic operation unit within a range between a new inductive reactive current maximum value and a new capacitive reactive current maximum value, so as to output a reactive current output value; and a second arithmetic operation unit adding the preset reactive current set value to the reactive (Continued)

current output value output from the PI control unit so as to output a reactive current reference value.

5 Claims, 5 Drawing Sheets

(56) References Cited

U.S. PATENT DOCUMENTS

| | | | |
|---|---|---|---|
| 2011/0074367 A1* | 3/2011 | Yoon | H02J 3/1842 323/210 |
| 2011/0156389 A1* | 6/2011 | Arlaban Gabeiras | H02J 3/1885 290/44 |
| 2013/0207620 A1* | 8/2013 | Li | H02J 3/1842 322/37 |

FOREIGN PATENT DOCUMENTS

| | | |
|---|---|---|
| KR | 10-0497768 B1 | 6/2005 |
| KR | 10-1125795 B1 | 3/2012 |
| KR | 10-1505472 B1 | 3/2015 |

\* cited by examiner

HYBRID CONTROL DEVICE FOR STATIC SYNCHRONOUS COMPENSATOR (STATCOM)

TECHNICAL FIELD

The present invention relates to a hybrid control device for a static synchronous compensator (STATCOM) and, more particularly, to a hybrid control device for the STATCOM, which enables a voltage regulation mode and a VAR control mode to be simultaneously applied in the STATCOM.

BACKGROUND ART

Static synchronous compensators (STATCOM) are a class of flexible AC transmission system (FACTS) devices referred to as power electronics based reactive power compensation devices that are connected to a power system and used to increase power transfer capacity and maximize utilization of existing equipment while maintaining system stability and utility.

Typically, such a STATCOM operates in one of a voltage regulation mode and a VAR control mode depending on a system to which the STATCOM is applied. In the voltage regulation mode, output voltage is regulated within the range of the voltage-current V-I curve, and the VAR control mode compensates for the reactive power fluctuating in the load to keep the reactive power output of STATCOM constant.

FIG. 1 illustrates a V-I characteristic graph for a conventional STATCOM when operating in the voltage regulation mode. With reference to the drawing, when the reactive current $I_q$ is within a range of a inductive reactive current maximum value $I_{LMAX}$ and a capacitive reactive current maximum value $I_{CMAX}$, which are determined according to a rating of the converter of the STATCOM, the output voltage $V_T$ of the STATCOM is regulated to the reference voltage $V_{ref}$. However, this typically results in a voltage drop of 1 to 4% at the maximum reactive power output, wherein the voltage drop appears as a specific droop in the V-I characteristic graph. Here, the droop refers to a slope in the V-I characteristic graph.

FIG. 2 is a block diagram of a control device for the conventional STATCOM according to FIG. 1.

With reference to FIG. 2, an arithmetic operation unit 11 receives the reference voltage $V_{ref}$ of the STATCOM and the output voltage $V_T$ output from the output terminal of the STATCOM, respectively, and calculates a deviation, and a PI controller 12 performs PI control with respect to the deviation using the inductive reactive current maximum value $I_{LMAX}$ and the capacitive reactive current maximum value $I_{CMAX}$ so as to output the reactive current reference value $I_{qref}$ desired to be controlled.

However, in such a conventional art, when the reactive current reference value Iqref is output through the PI control with respect to the deviation between the reference voltage $V_{ref}$ and the output voltage $V_T$ in the voltage regulation mode of the STATCOM, at the reference voltage $V_{ref}$ desired to be maintained, the reactive current $I_q$ of the STATCOM is fixed to zero, so reactive power compensation according to load change is not made. That is, when the STATCOM operates in the voltage regulation mode, the output voltage may be kept constant at the reference voltage $V_{ref}$, but there is a problem in that compensation for a change in reactive power is not made.

Accordingly, there is a need in the art for the development of a technique that allows simultaneously accomplishing regulation and compensation of the output voltage and reactive power, respectively, which are changed by many different variables during the operation of the STATCOM.

DISCLOSURE

Technical Problem

The present invention has been proposed in consideration of the problems and requirements of a conventional art, and an objective thereof is to provide a hybrid control device for a static synchronous compensator (STATCOM), which enables a voltage regulation mode and a VAR control mode to be simultaneously applied in the STATCOM.

Technical Solution

In order to accomplish the above objective, the present invention provides a hybrid control device for the STATCOM according to an embodiment of the present invention, the device including: a first arithmetic operation unit configured to calculate a deviation between reference voltage $V_{ref}$ desired to be controlled by the STATCOM and output voltage $V_T$ output from the STATCOM and to output the same; a proportional integral (PI) controller configured to perform PI control with respect to the deviation output from the first arithmetic operation unit, within a range between a new inductive reactive current maximum value $I_{LMAX}\text{-}I_{qset}$ subtracting a preset reactive current value $I_{qset}$ to be changed from a preset inductive reactive current maximum value $I_{LMAX}$, and a new capacitive reactive current maximum value $I_{CMAX}\text{-}I_{qset}$ subtracting the preset reactive current set value $I_{qset}$ to be changed from a preset capacitive reactive current maximum value $I_{CMAX}$ and to output a reactive current output value $I_q$; and a second arithmetic operation unit configured to add the preset reactive current value $I_{qset}$ to the reactive current output value $I_q$ output from the PI controller and to output a reactive current reference value $I_{qref}$.

In the present invention, the reference voltage $V_{ref}$ may have a preset deadband range, and the output voltage $V_T$ of the STATCOM may be output by being controlled to be a value within a deadband range of the reference voltage $V_{ref}$ over a zone of the reactive current value $I_{qset}$.

In the present invention, in the STATCOM, a margin for inductive reactive current compared to capacitive reactive current may be relatively larger.

In the present invention, the device may further include a droop setting unit configured to set a droop value according to the reactive current $I_q$ output from the PI controller and to feed the droop value to the first arithmetic operation unit, wherein the first arithmetic operation unit is configured to sum the droop value fed thereto and the deviation between the reference voltage $V_{ref}$ and the output voltage $V_T$ and to output a summed value.

Advantageous Effects

According to the present invention, since the voltage regulation mode and the VAR control mode can be applied simultaneously during the operation of the STATCOM, output voltage and reactive power, which are changed by a load or other causes, can be simultaneously regulated and compensated, respectively.

In addition, according to the present invention, in a state where the reactive power output of the STATCOM is arbitrarily set, the desired reference voltage can be maintained.

In addition, according to the present invention, a margin of an area requiring the same can be further secured by varying the capacitive rating and the inductive rating of the STATCOM according to system characteristics.

MODE FOR INVENTION

Figure 1:
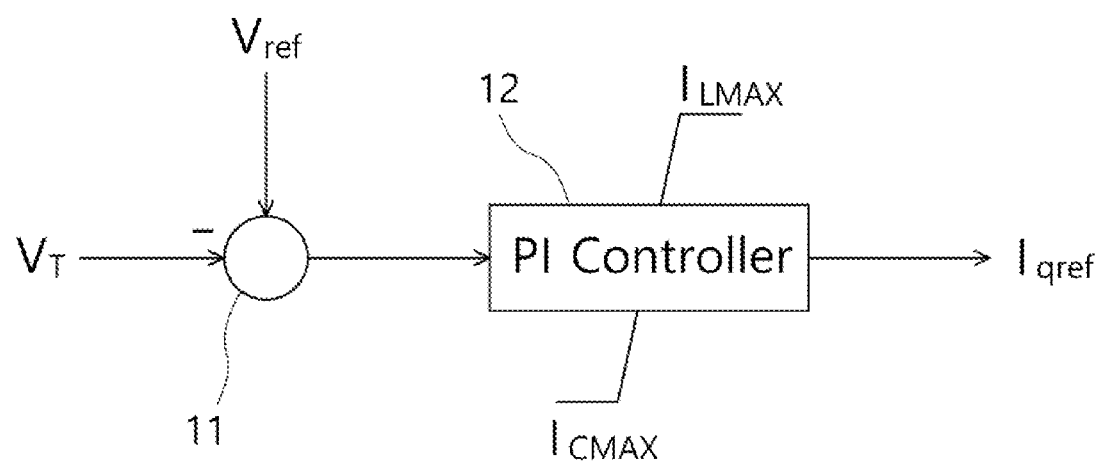
FIG. 1 is a V-I characteristic graph for a conventional STATCOM.
Figure 2:
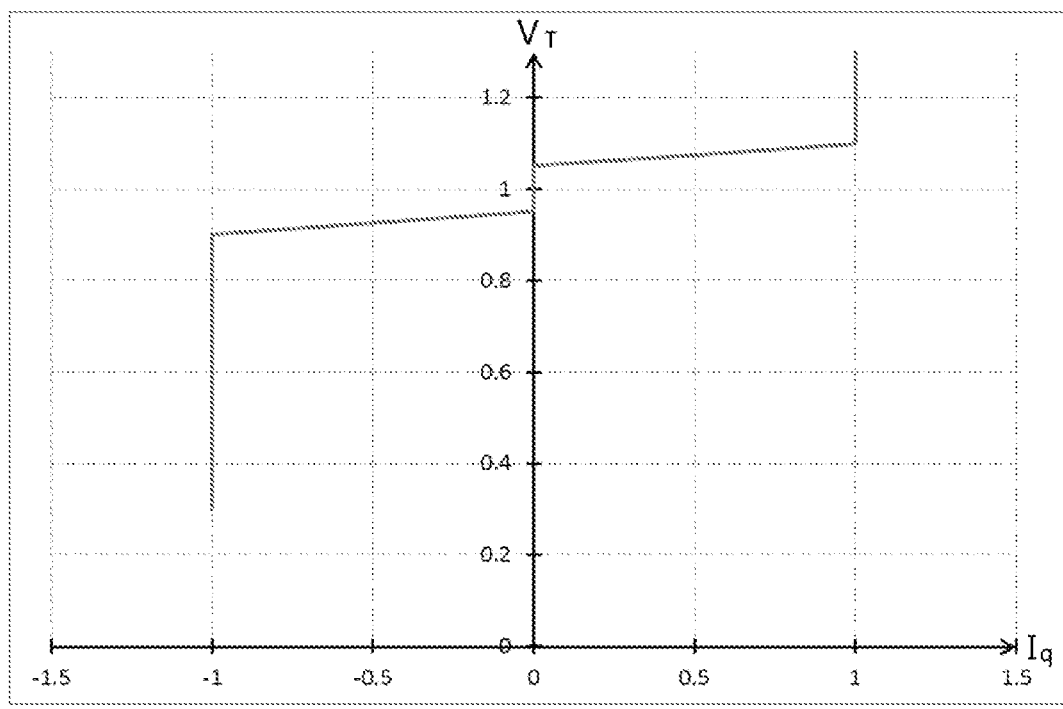
FIG. 2 is a block diagram of a control device according to a voltage regulation mode for the conventional STATCOM.

Hereinafter, exemplary embodiments of the present invention will be described in detail with reference to the accompanying drawings. In adding reference numerals to components of each drawing, it should be noted that the same reference numerals are assigned to the same components as much as possible even though the same components are shown in different drawings. In addition, in describing an embodiment of the present invention, when it is determined that the detailed description of the related well-known configuration or function obfuscates the understanding of the embodiment of the present invention, the detailed description thereof will be omitted.

In addition, in describing the components of the embodiments of the present invention, terms such as first, second, A, B, (a), (b), and the like may be used. Such terms are only for distinguishing the components from other components, and essence or a sequence or an order of the components are not limited by the terms. When a component is described as being "coupled", "combined", or "connected" to another component, that the component may be directly coupled, combined or connected to that another component, but it will be understood that another different component may be "coupled", "combined", or "connected" therebetween.

Figure 3:
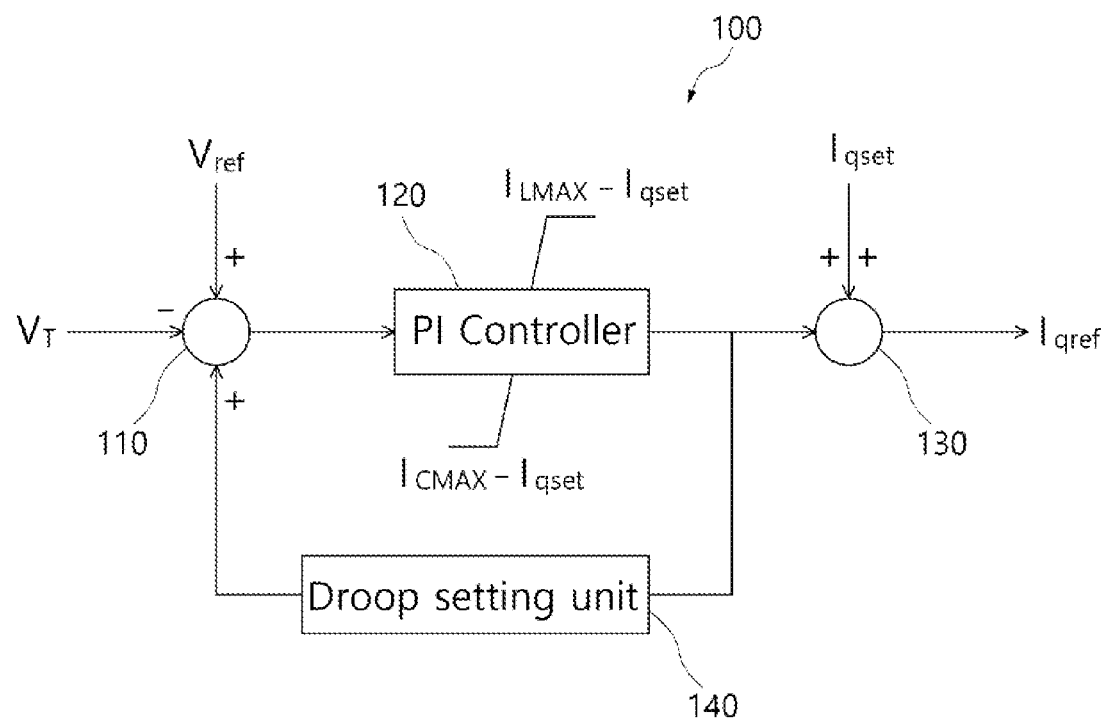
FIG. 3 is a block diagram of a hybrid control device for a STATCOM according to an exemplary embodiment of the present invention.
Figure 4:
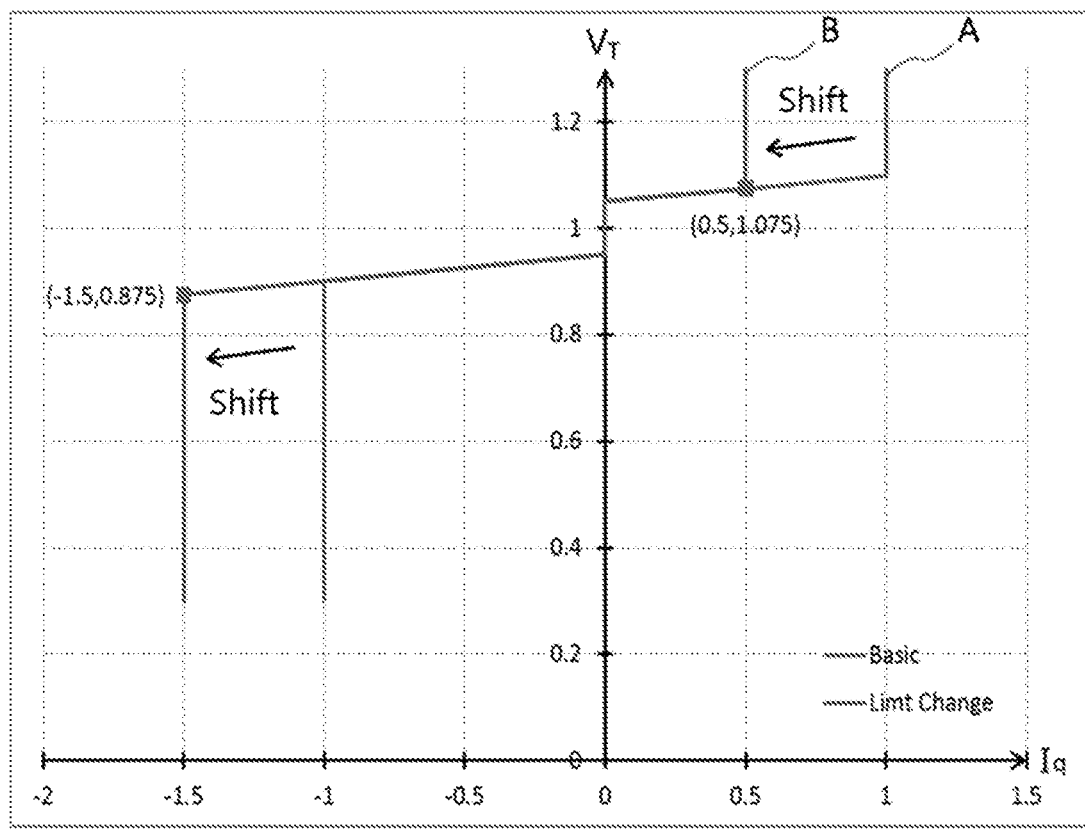
FIG. 4 is a V-I characteristic graph in a case where an inductive reactive current is added to a PI controller in the hybrid control device for the STATCOM according to the exemplary embodiment of the present invention.
Figure 5:
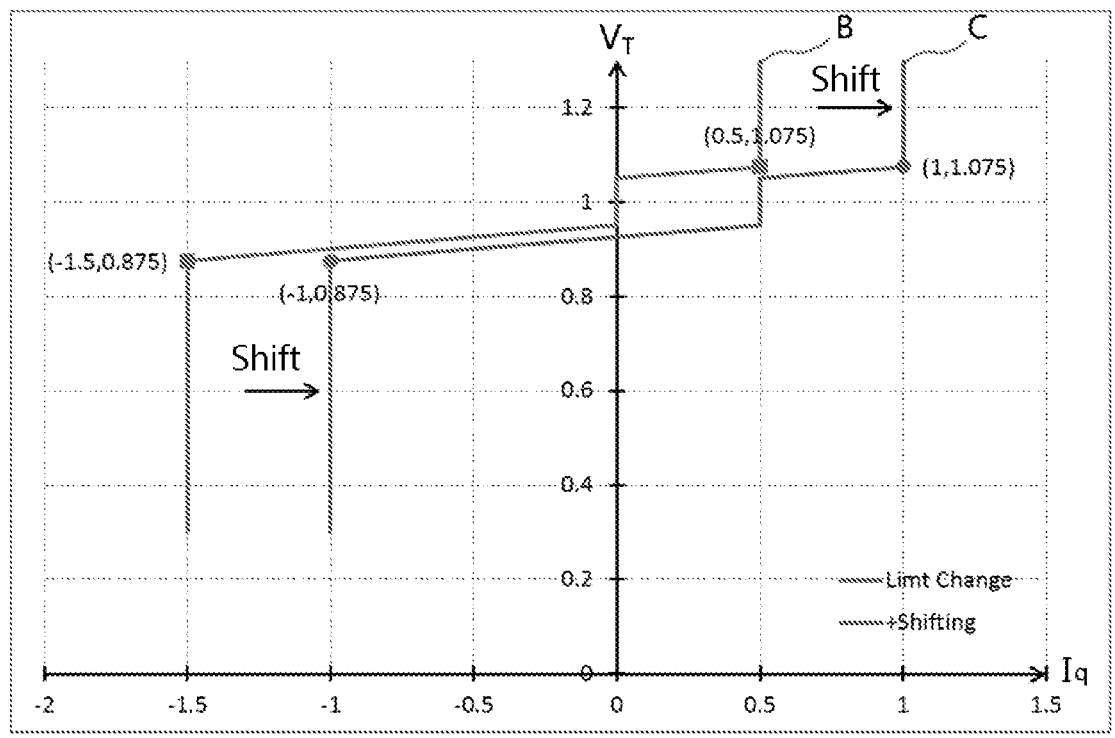
FIG. 5 is a V-I characteristic graph in a case where an inductive reactive current is added to a PI control result in the hybrid control device for the STATCOM according to the exemplary embodiment of the present invention.

FIG. 3 is a block diagram of a hybrid control device for a STATCOM according to an exemplary embodiment of the present invention, FIG. 4 is a V-I characteristic graph in a case where an inductive reactive current is added to a PI controller in the hybrid control device for the STATCOM according to the exemplary embodiment of the present invention, and FIG. 5 is a V-I characteristic graph in a case where an inductive reactive current is added to a PI control result in the hybrid control device for the STATCOM according to the exemplary embodiment of the present invention.

With reference to FIG. 3, the hybrid control device 100 for the STATCOM according to the present invention includes a first arithmetic operation unit 110, a PI controller 120, and a second arithmetic operation unit 130. In another embodiment, the hybrid controller 100 may further selectively include a droop setting unit 140.

The first arithmetic operation unit 110 calculates a deviation between reference voltage $V_{ref}$ desired to be controlled by the STATCOM and output voltage $V_T$ output from the STATCOM. In this case, the first arithmetic operation unit 110 may selectively sum a droop value of the output voltage output from the droop setting unit 140 to be described later. Such a deviation becomes a difference value between the reference voltage $V_{ref}$ desired to be controlled by the STATCOM and the output voltage $V_T$ actually output. Here, a predetermined deadband range may be set in the reference voltage $V_{ref}$ according to characteristics for the STATCOM or a system the device is applied to. This implies that the reference voltage $V_{ref}$ may be set within the deadband range.

The PI controller 120 performs a proportional integral (PI) control in a direction of reducing the deviation by performing the PI control with respect to the deviation between the reference voltage $V_{ref}$ and the output voltage $V_T$. At this time, the PI controller 120 performs the PI control with respect to the deviation, which is the output of the first arithmetic operation unit 110, within the range of the new inductive reactive current maximum value $I_{LMAX}$-$I_{qset}$ and the new capacitive reactive current maximum value $I_{CMAX}$-$I_{qset}$, wherein the new inductive reactive current maximum value $I_{LMAX}$-$I_{qset}$ is obtained by subtracting a reactive current set value $I_{qset}$ to be changed from the inductive reactive current maximum value $I_{LMAX}$, and the new capacitive reactive current maximum value $I_{CMAX}$-$I_{qset}$ is obtained by subtracting the reactive current set value $I_{qset}$ to be changed from the capacitive reactive current maximum value $I_{CMAX}$. The PI controller 120 outputs a reactive current output value $I_q$ to reduce the deviation between the reference voltage $V_{ref}$ desired to be controlled by the STATCOM and the output voltage $V_T$ output from the STATCOM.

The droop setting unit 140 sets a droop value according to the reactive current $I_q$ output from the PI controller 120 and feeds the droop value to the first arithmetic operation unit 110. In this case, the first arithmetic operation unit 110 sums the droop value fed as described above and the deviation between the reference voltage $V_{ref}$ and the output voltage $V_T$ and outputs a result.

In FIG. 4, a V-I characteristic graph is shown for a state where the reactive current set value $I_{qset}$ to be changed is added to a limit of the PI controller 110 in order to change the inductive reactive current maximum value as well as the capacitive reactive current maximum value.

In the V-I characteristic graph of FIG. 4, illustrated is an embodiment in which, for convenience of description, the inductive reactive current maximum value $I_{LMAX}$ and the capacitive reactive current maximum value $I_{CMAX}$ are set to +1.0 pu and −1.0 pu, respectively, and the output voltage VT, the deadband, and the droop are set to +1.0 pu, ±0.05 pu, and +0.05 pu, respectively. In addition, the reactive current set value Iqset to be added is set to +0.5 pu.

As may be seen from the drawing, the PI controller 120 becomes to perform the PI control with respect to the deviation, with values which are inductive reactive current maximum value $I_{LMAX}$ and the capacitive reactive current maximum value $I_{CMAX}$ subtracted by the reactive current set value $I_{qset}$ of +0.5 pu, respectively. Therefore, the inductive reactive current maximum value $I_{LMAX}$ is changed from +1.0 pu to +0.5 pu, and the capacitive reactive current maximum value $I_{CMAX}$ is changed from −1.0 pu to −1.5 pu. That is, this means that the inductive reactive current maximum value $I_{LMAX}$ and the capacitive reactive current maximum value $I_{CMAX}$ are changed by −0.5 pu, respectively. As shown in the V-I characteristic graph of FIG. 4, the graph is shifted by −0.5 pu to the left from a reference numeral A to a reference numeral B. In this case, the droop due to the voltage drop is applied the same as before.

Such a change brings a result that the inductive reactive current maximum $I_{LMAX}$ to decrease to +0.5 pu and the capacitive reactive current maximum $I_{CMAX}$ to −1.5 pu.

Thereafter, the second arithmetic operation unit 130 receives an output value of the PI controller 120 and performs an arithmetic operation of adding the reactive current set value $I_{qset}$ to the output value. As an example, assuming that the reactive current set value Iqset is 0.5 pu, this results in a shift to the right by +0.5 pu from the reference numeral B to a reference numeral C as shown in the V-I characteristic graph shown in FIG. 5.

As a result, the inductive reactive current maximum value $I_{LMAX}$ and the capacitive reactive current maximum value $I_{CMAX}$ become +1.0 pu and −1.0 pu, respectively, which are the initial values thereof. However, the output voltage $V_T$ is driven at the reference voltage $V_{ref}$ in a state where the inductive reactive current set value $I_{qset}$ is shifted by +0.5 pu.

Here, when, as in the above example, initially the reference voltage $V_{ref}$ is set to +1.0 pu and the deadband is set to ±0.05 pu, through the shift as above, the output voltage $V_T$ for the STATCOM is operated in the range of +0.95 pu<$V_T$<+1.05 pu as the output voltage $V_T$ shifted in the region, at which the inductive reactive current set value is +0.5 pu. In addition, outside of a deadband zone, the output voltage $V_T$ of the STATCOM is regulated according to the droop value +0.05 pu.

Because the reactive current set value $I_{qset}$ is set by shifting the inductive region by +0.5 pu, the margin for inductive reactive current compared to capacitive reactive current becomes large. This allows compensation for reactive power to be accomplished together while voltage regulation is applied as an existing way, in the STATCOM.

As such, in the case of the reference numeral C in the V-I characteristic graph of FIG. 5, in the STATCOM, the output voltage $V_T$ within the range of +0.95 pu and +1.05 pu, which is within the deadband range with the reference voltage $V_{ref}$ as a reference, supplies the inductive reactive current of 0.5 pu. In addition, outside of the deadband range, the output voltage $V_T$ operates in the voltage regulation mode according to the set droop value +0.05 pu. This may be implemented by feeding a droop value from the droop setting unit 140 to the first arithmetic operation unit 110.

As a result, in the hybrid control device 100 for the STATCOM according to the present invention, the reactive current $I_{qset}$ is arbitrarily set in the STATCOM, thereby having an advantage of allowing the reactive power output for the STATCOM to be maintained in the deadband zone of the reference voltage $V_{ref}$. In addition, there is an advantage that the margin of the area requiring the same may be secured by varying the capacitive rating and the inductive rating of the STATCOM by the user as necessary according to the characteristics of the system.

In a conventional control device for the STATCOM, in the 0.95 to 1.05 pu, which is the deadband zone of the reference voltage $V_{ref}$ desired to be maintained, the reactive current output $I_q$ of the STATCOM is fixed to zero and the capacitive rating and the inductive rating of the STATCOM have the same characteristics as each other. Compared to the conventional control device, the hybrid control device for the STATCOM according to the present invention has an advantage that voltage regulation and reactive power compensation may be accomplished simultaneously, and the margin for the inductive reactive current compared to capacitive reactive current may be increased.

In the above description, all elements constituting the embodiments of the present invention are described as being combined or operating in combination thereof, but the present invention is not necessarily limited to the embodiments. That is, within the scope of the present invention, all of the components may be operated in selective combination with one or more. In addition, the terms "comprise", "constitute" or "have" described above imply that the corresponding component may be included unless stated to the contrary, and thus, it should be construed that it may further include other components rather than exclude other components. All terms, including technical and scientific terms, have the same meaning as commonly understood by one of ordinary skill in the art unless otherwise defined. Terms commonly used, such as terms defined in a dictionary, should be interpreted to coincide with the contextual meaning of the related art and should not be interpreted in an ideal or excessively formal sense unless explicitly defined in the present invention.

The above description is merely illustrative of the technical idea of the present invention, and those skilled in the art to which the present invention pertains may make various modifications and changes without departing from the essential characteristics of the present invention. Therefore, the embodiments disclosed in the present invention are not intended to limit the technical idea of the present invention but to describe the present invention, and the scope of the technical idea of the present invention is not limited by these embodiments. The scope of protection of the present invention should be interpreted by the following claims, and all technical ideas within the scope equivalent thereto should be construed as being included in the scope of the present invention.

The invention claimed is:

1. A hybrid control device for a static synchronous compensator (STATCOM), the hybrid control device comprising:
    a first arithmetic operation unit configured to calculate a deviation between a reference voltage ($V_{ref}$) desired to be controlled by the STATCOM and output voltage ($V_T$) output from the STATCOM and to output the deviation;
    a proportional integral (PI) controller configured to perform PI control with respect to the deviation output from the first arithmetic operation unit, within a range between a new inductive reactive current maximum value ($I_{LMAX}$-$I_{qset}$) subtracting a preset reactive current value ($I_{qset}$) to be changed from a preset inductive reactive current maximum value ($I_{LMAX}$), and a new capacitive reactive current maximum value ($I_{CMAX}$-$I_{qset}$) subtracting the preset reactive current set value ($I_{qset}$) to be changed from a preset capacitive reactive current maximum value ($I_{CMAX}$) and to output a reactive current output value ($I_q$); and
    a second arithmetic operation unit configured to add the preset reactive current value ($I_{qset}$) to the reactive current output value ($I_q$) output from the PI controller and to output a reactive current reference value ($I_{qref}$).

2. The hybrid control device of claim 1, wherein the reference voltage ($V_{ref}$) has a preset deadband range.

3. The hybrid control device of claim 1, wherein the output voltage ($V_T$) of the STATCOM is output by being controlled to be a value within a deadband range of the reference voltage ($V_{ref}$) over a zone of the reactive current value ($I_{qset}$).

4. The hybrid control device of claim 3, wherein, in the STATCOM, a margin for inductive reactive current compared to capacitive reactive current is relatively larger.

5. The hybrid control device of claim 1, further comprising:
   a droop setting unit configured to set a droop value according to the reactive current ($I_q$) output from the PI controller and to feed the droop value to the first arithmetic operation unit, wherein
   the first arithmetic operation unit is configured to sum the droop value fed thereto and the deviation between the reference voltage ($V_{ref}$) and the output voltage ($V_T$) and to output a summed value.

* * * * *